United States Patent

Lubeley et al.

(10) Patent No.: US 10,102,325 B2
(45) Date of Patent: Oct. 16, 2018

(54) METHOD FOR DETERMINING THE POWER CONSUMPTION OF A PROGRAMMABLE LOGIC DEVICE

(71) Applicant: dSPACE digital signal processing and control engineering GmbH, Paderborn (DE)

(72) Inventors: Dominik Lubeley, Verl (DE); Marc Schlenger, Paderborn (DE); Heiko Kalte, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 15/291,113

(22) Filed: Oct. 12, 2016

(65) Prior Publication Data

US 2017/0116363 A1 Apr. 27, 2017

(30) Foreign Application Priority Data

Oct. 23, 2015 (DE) ........................ 10 2015 118 129

(51) Int. Cl.
*G06F 17/00* (2006.01)
*G06F 17/50* (2006.01)

(52) U.S. Cl.
CPC ...... *G06F 17/5054* (2013.01); *G06F 17/5022* (2013.01); *G06F 17/5036* (2013.01); *G06F 2217/78* (2013.01)

(58) Field of Classification Search
USPC ........................................................ 716/109
See application file for complete search history.

(56) References Cited

U.S. PATENT DOCUMENTS 7,810,058 B1 10/2010 Tuan
8,146,035 B1 3/2012 Schumacher et al.
(Continued)

FOREIGN PATENT DOCUMENTS

DE 10 2006 020 561 B3 11/2007

OTHER PUBLICATIONS

Li Shang et al., "Dynamic Power Consumption in Virtex™-II FPGA Family," Proceedings of the ACM International Symposium on Field-Programmable Gate Arrays, p. 157-164, California, USA (Feb. 2002).

(Continued)

*Primary Examiner* — Mohammad Alam
(74) *Attorney, Agent, or Firm* — Muncy, Geissler, Olds & Lowe, P.C.

(57) ABSTRACT

A method for determining the power consumption of a programmable logic device, in which at least one configuration parameter is determined in accordance with a predefined configuration and at least one device parameter is determined in accordance with the programmable logic device. The predefined configuration is designed such that the programmable logic device exchanges data with a computing unit through at least one interface pin and receives data from at least one signal source and/or sends it to at least one signal receiver through at least one interface pin. At least one data characteristic of the data exchanged between the computing unit and the programmable logic device as well as at least one signal characteristic of the data received from the at least one signal source and/or sent to the at least one signal receiver are determined.

18 Claims, 5 Drawing Sheets

(56) References Cited

U.S. PATENT DOCUMENTS

| | | | |
|---|---|---|---|
| 8,495,538 B1 | 7/2013 | Frost et al. | |
| 2003/0105620 A1 | 6/2003 | Bowen | |
| 2005/0258862 A1* | 11/2005 | Rahim | G06F 17/5054 326/38 |
| 2006/0119382 A1* | 6/2006 | Shumarayev | G06F 17/5054 326/33 |
| 2007/0257646 A1 | 11/2007 | Leutgeb et al. | |
| 2010/0174923 A1* | 7/2010 | Houlihan | G06F 1/3215 713/300 |
| 2017/0116363 A1* | 4/2017 | Lubeley | G06F 17/5022 |
| 2017/0192485 A1* | 7/2017 | Dhanwada | G06F 1/3228 |
| 2017/0272073 A1* | 9/2017 | Betz | H03K 19/00369 |

OTHER PUBLICATIONS

English-Language Translation of German Office Action for German Patent Application No. 102015118129A1 dated Jan. 18, 2018.
English-Language Translation of German Search Report for German Patent Application No. 102015118129A1 dated Jan. 18, 2018.
English-Language Translation of Wikipedia document: Uberstromschutzeinrichtung.

* cited by examiner

METHOD FOR DETERMINING THE POWER CONSUMPTION OF A PROGRAMMABLE LOGIC DEVICE

This nonprovisional application claims priority under 35 U.S.C. § 119(a) to German Patent Application No. 10 2015 118 129.0, which was filed in Germany on Oct. 23, 2015, and which is herein incorporated by reference.

BACKGROUND OF THE INVENTION

Field of the Invention

The invention relates to a method for determining the power consumption of a programmable logic device, a method for designing a configuration of a programmable logic device, and a programming device for writing on a programmable logic device.

Description of the Background Art

In many technical fields, control units are used to control a physical process, wherein new measured values are acquired, preferably cyclically, from one or more sensors, and one or more actuators are driven on the basis of a comparison of the measured values with setpoint values. For rapid design of new control units and/or control algorithms, it is possible to build on an existing control unit and simply replace individual functions. As an alternative to this procedure, known as bypassing, it is also possible to connect a rapid control prototyping system (abbreviated as RCP system) that is specifically adapted for controller design in "full pass" operation to the sensors and actuators required for the desired control instead of a control unit. RCP systems are available that can also be used in the engine compartment of a motor vehicle because of their compact dimensions and passive cooling.

Programmable logic devices, known as Field Programmable Gate Arrays (FPGA), are increasingly being used for the simulation and control of highly dynamic systems. A programmable logic device comprises a plurality of logic elements and connecting elements as well as a clock supply that may comprise multiple clock regions. The logic elements include registers, truth tables (also known as lookup tables or LUT), adders, and delay units, for example. Frequency generators and dedicated computing devices, e.g. for multiplication, can also be present. The connecting elements usefully comprise conductive traces of differing lengths, which for example can also extend across regions of the FPGA, and switchable connections between the conductive traces and logic elements. After the power supply is switched on, the FPGA is initialized with a bit stream that usefully contains at least one bit for each logic element and for each switchable connecting element, and thus makes possible a circuit custom-tailored for the specific application. As a result of the good matching to the specific application and parallel processing of signals, FPGAs can also reliably control rapidly changing controlled systems, and are used to drive electronically commutated synchronous machines, for example.

A general problem in the use of programmable logic devices is that the dynamic power consumption of the FPGA depends heavily on the configuration, which is to say in particular the controller model being implemented, and on the stimuli, which is to say the signals present at the interface pins. Since changes at the interface pins can propagate through the entire FPGA and result in repeated switching of logic gates during a single clock, a high rate of change of the stimuli causes a significantly increased power consumption by the FPGA. When FPGAs are used in an RCP system, this can have critical consequences if the resultant waste heat overloads a passive cooling system or the power supply.

The article, "Dynamic Power Consumption in Virtex™-II FPGA Family," by Li Shang et al., Proceedings of the ACM International Symposium on Field-Programmable Gate Arrays 2002, pp. 157-164, describes an analysis of the dynamic power consumption of a commercial FPGA that is substantially caused by charging and discharging of the capacitances of the individual elements of the programmable logic device and the short circuit currents during switching, for example, of inverters in the registers. It is proposed to determine the power consumption P using a formula $P=\frac{1}{2}V^2 f \Sigma_i C_i U_i S_i$, where V is the supply voltage, f is the clock frequency, $C_i$ is an effective capacitance, $U_i$ is a utilization, and $S_i$ is a switching activity of the examined element i. The article also presents a possible procedure for estimating the power consumption based on a placed netlist of the configuration.

In U.S. Pat. No. 7,810,058 B1, a method for simulating operation of an integrated circuit is described in which an effective capacitance for the different types of programmable resources of the integrated circuit is determined before the device in question is manufactured. Based on a netlist, a switched capacitance for the specific type of programmable resource and a parasitic line capacitance are determined and combined. For each type, an average switching frequency is determined, and an estimated power consumption of the designed integrated circuit is determined on the basis thereof. In this way, a power consumption of an integrated circuit can be estimated at an early stage.

From U.S. Pat. No. 8,146,035 B1, a method is known for estimating the power consumption of a circuit based on a design for the circuit. A multiplicity of example circuit designs comprising circuit elements according to one or more structural templates is simulated in order to determine initial switching rates for the circuit elements, and a database of structural templates and associated equations that describe the initial switching rates is constructed. For a multiplicity of circuit elements from which the design for the circuit is constructed, a correspondence with the structural templates stored in the database is determined and an estimated switching rate is determined in each case based on the equations associated with the structural templates. Based on the estimated switching rates of the circuit elements, an estimated power consumption of the circuit is determined. This makes it possible to take into account structures having a switching frequency that differs significantly from the average when estimating the power consumption.

Manufacturers of programmable logic devices, such as Xilinx and Altera, often provide programs for estimating the power consumption of their FPGAs. While the manufacturers are well able to take into account the structural characteristics of the programmable logic device and the characteristics of the manufacturing process used, it is still the case that the dynamic behavior of a specific configuration can be described only with limited accuracy for reasons that include simplifying assumptions.

SUMMARY OF THE INVENTION

It is therefore an object of the invention to provide a method and a device that advance the state of the art and make possible a realistic estimate of the dynamic power consumption for the specific application case.

According to an exemplary embodiment of the invention, a method for determining the power consumption of a programmable logic device is thus provided in which at least one configuration parameter is determined in accordance with the predefined configuration and at least one device parameter is determined in accordance with the programmable logic device, wherein the predefined configuration is designed such that the programmable logic device exchanges data with a computing unit through at least one interface pin and receives data from at least one signal source and/or sends it to at least one signal receiver through at least one interface pin, wherein at least one data characteristic of the data exchanged between the computing unit and the programmable logic device is determined, wherein at least one signal characteristic of the data received from the at least one signal source and/or sent to the at least one signal receiver is determined, and wherein the power consumption is determined as a function of the at least one configuration parameter, the at least one device parameter, the at least one data characteristic, and the at least one signal characteristic.

The at least one configuration parameter that is determined in accordance with the predefined configuration can usefully indicate the number of logic elements used in the current configuration. For example, it can be a relative indication of the area used. A configuration parameter is thus preferably to be understood as a parameter describing the structural characteristics of the predefined configuration.

The at least one device parameter that is determined in accordance with the programmable logic device, for example, that is determined with the aid of a device identifier from information from the manufacturer, can usefully indicate a leakage current or a static power consumption of the programmable logic device used. In general, it can also be a device parameter describing the characteristics of an overall circuit incorporating the programmable logic device or of a housing that contains it, for example, describing cooling characteristics such as a thermal resistance.

The at least one interface pin can be, for example, a physical pin that is soldered into a circuit and that connects the programmable logic device to other parts of the circuit. However, it can also be a register located directly before or after an interface pin of the programmable logic device in the signal path or a driver of an output that is used in the configuration. For a method according to the invention, provision can be made to simulate the predefined configuration rather than to use a programmable logic device that is physically present; in this case the interface pin can also be purely virtual.

The computing unit can be, for example, a microcontroller that is arranged in a control unit together with the programmable logic device. In general, the computing unit can also be arranged to be separate from the programmable logic device and connected thereto only through the bus. Consequently, the computing unit can also be implemented as a standard PC.

The at least one signal source can be, for example, a sensor, for example one or more position sensors of a rotor of an electric machine. The signal source can also usefully be implemented as an analog-to-digital converter connected to an analog device. The at least one signal characteristic can include a maximum data rate determined with the aid of the conversion time, for example.

The at least one signal receiver can be implemented, for example, as an actuator or as a drive circuit connected to an actuator. The at least one signal characteristic can be determined, for example, with the aid of the dynamic characteristics of the actuator, and can include a time constant of the actuator or a quantity derived therefrom, for example.

Methods that are already known per se, in particular programs for estimating the power consumption that are provided by the manufacturer of the programmable logic device, can usefully be employed for determining the power consumption.

The method according to the invention has the advantage that a determination of the anticipated power consumption is accomplished with high accuracy. The disadvantages of prior art methods for determining the power consumption are avoided by the means that the specific application case is taken into account in a systematic manner in determining the power consumption.

The at least one data characteristic can include a first rate of change that is determined with the aid of a number and/or an interface activity of one or all tasks of the computing unit that are connected to the programmable logic device, wherein the computing unit preferably is implemented as a real-time computer. In this regard, a real-time computer is to be understood to mean such computing units as have a clearly predefined time behavior, for example, a predefined maximum latency between the reception of an input signal and a response in the form of an output signal. Taking into account the time behavior of the real-time computer, and usefully the individual tasks, makes it possible to more accurately estimate the rate of change of incoming data, for example, for the offline simulation of a predefined configuration.

The data characteristics can include a number of interface pins assigned for the data exchange with the computing unit or a bus width of the data bus used for the data exchange with the real-time computer, wherein the first rate of change preferably is a rate of change averaged over the assigned interface pins or a first rate of change is associated with every assigned interface pin.

The at least one signal characteristic can include a second rate of change and/or a third rate of change and/or a number of interface pins connected to a signal source and/or a number of interface pins connected to a signal receiver, wherein preferably the second rate of change is determined with the aid of a sample rate of one or every signal source connected to the programmable logic device, and wherein preferably the third rate of change is determined with the aid of an output rate of one or every interface pin connected to a signal receiver. Especially in the offline simulation of a predefined configuration, it can be useful for the sample rate and/or output rate to be determined with the aid of characteristics of the tasks used for the simulation of the signal source and/or signal receiver. Provision can also be made in this context that this at least one task is executed on a computing unit implemented as a real-time computer that is also connected to the programmable logic device's data bus that is used in the predefined configuration.

According to an exemplary embodiment of the invention, the predefined configuration can be simulated in a workstation or is written into a programmable logic device and executed, wherein the computing unit, the at least one signal source, and/or the at least one signal receiver are operated or simulated in such a manner that the predefined configuration exchanges, receives, and/or transmits data corresponding to a predefined process, wherein the corresponding data are recorded for a predefined period of time or until a predefined end condition is satisfied, and wherein the at least one data characteristic and the at least one signal characteristic are determined in accordance with the recorded data. The workstation can be a standard PC or a real-time computer; combinations of multiple computers in a network can also be used as a workstation. In this way, the predefined configuration can be operated in an online simulation, in which not only the computing unit but also the signal source and/or signal receiver are present as physical devices and are operated in accordance with the predefined process, or are operated in an offline simulation. In an offline simulation, provision can be made that all components of the circuit are simulated in one or more computing units; if the configuration consists of a fixed transformation portion and a freely selectable model portion, then it is also possible in useful fashion for only the model portion to be simulated and for the corresponding data to be determined at the corresponding registers or virtual interface pins of the customer model. Moreover, intermediate stages are possible in which the computing unit and/or a signal source and/or a signal receiver are physically present, while the other parts of the circuit are simulated.

In an embodiment of the invention, at least one signal source and/or at least one signal receiver is/are simulated. This makes it possible to determine the power consumption at an especially early stage in the development of a control unit.

In an embodiment of the invention, the at least one signal source and/or at least one signal receiver are physically present and are operated with signals in accordance with the predefined process. Accuracy can be improved through hardware-in-the-loop simulations, wherein the computing unit as well as the signal source and/or the signal receiver can be physically present, especially at a later stage of development.

At least one user parameter can be predefined by the user, and the power consumption of the programmable logic device can also be determined as a function of the at least one user parameter. For example, the at least one user parameter can be a clock frequency with which the programmable logic device is operated.

The predefined configuration can have a fixed transformation portion and a freely selectable model portion, wherein the transformation portion transforms a rate of change of data present on at least one assigned or connected interface pin according to a mapping function, and wherein the rate of change present at the logic element(s) of the model portion is determined for each assigned or connected interface pin in accordance with the mapping function. The mapping function can include a predefined delay of incoming data and/or a limitation of the rate of change to a fixed maximum value.

According to an exemplary embodiment of the invention, the recorded data can be divided into one or more segments, wherein at least one segment is selected and output in accordance with a predefined selection condition. The predefined selection condition can include, for example, an evaluation of a flag or of a signal that indicates the activity of a controller. A division can usefully occur into segments of predefined length or based on a predefined division condition. The division condition can be chosen such that a distinction is made between segments with control activity and without control activity.

In an embodiment of the invention, the predefined configuration can be written into a programmable logic device and executed, wherein the programmable logic device has at least one temperature sensor and/or at least one current sensor, and wherein at least one temperature signal and/or at least one current signal are recorded for a predefined period of time or until a predefined end condition is satisfied. If the examined process includes brake control, for example, the end condition can consist of e.g., the comparison of a simulated vehicle speed with a threshold value.

According to an embodiment of the invention, the determination of the power consumption can include a simulation of the predefined configuration, wherein an internal switching state of the programmable logic device is determined in each case, preferably with the aid of recorded data. Because the internal state of the programmable logic device is examined, the accuracy of the determined power consumption can be significantly improved still further.

The invention also relates to a method for designing a configuration of a programmable logic device, comprising a step in which the power consumption of a programmable logic device is determined by a method according to the invention with the aid of the currently designed configuration. Because a determination of the power consumption takes place with the aid of a method according to the invention at an early stage of development, it can already be taken into account during the design of the predefined configuration, thus preventing in advance the occurrence of potentially dangerous situations during a test.

In this regard, the programmable logic device can have one or more regions comprising at least one logic element, wherein a message is output and/or a predefined clock frequency of at least one region of the programmable logic device is reduced and/or at least one logic element, preferably at least one region comprising multiple logic elements, is deactivated, for example, by means of a signal or a disconnection of a clock supply and/or power supply, when the power consumption determined exceeds a predefined power threshold value. The message here can include a warning and/or a recommendation to reduce the clock frequency of the programmable logic device. Depending on the design of the programmable logic device, the deactivation of a region by means of a signal can take place in that a deactivation signal associated with the region is set or an activation signal is deactivated. The disconnection of the clock supply can take place by means of a signal as well. No switching then takes place in the deactivated region, so the dynamic power consumption of the programmable logic device is reduced.

In addition, the invention relates to a programming device for writing on a programmable logic device, comprising a processor, a programming interface, and/or a debugging interface, wherein the device is configured to carry out a method according to the invention. The programming device can also be implemented as a standard desktop or notebook PC.

The invention additionally relates to a computer program product with a computer-readable storage medium in which instructions are embedded that, when they are executed by a computing unit, have the effect that the computing unit is configured to carry out a method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
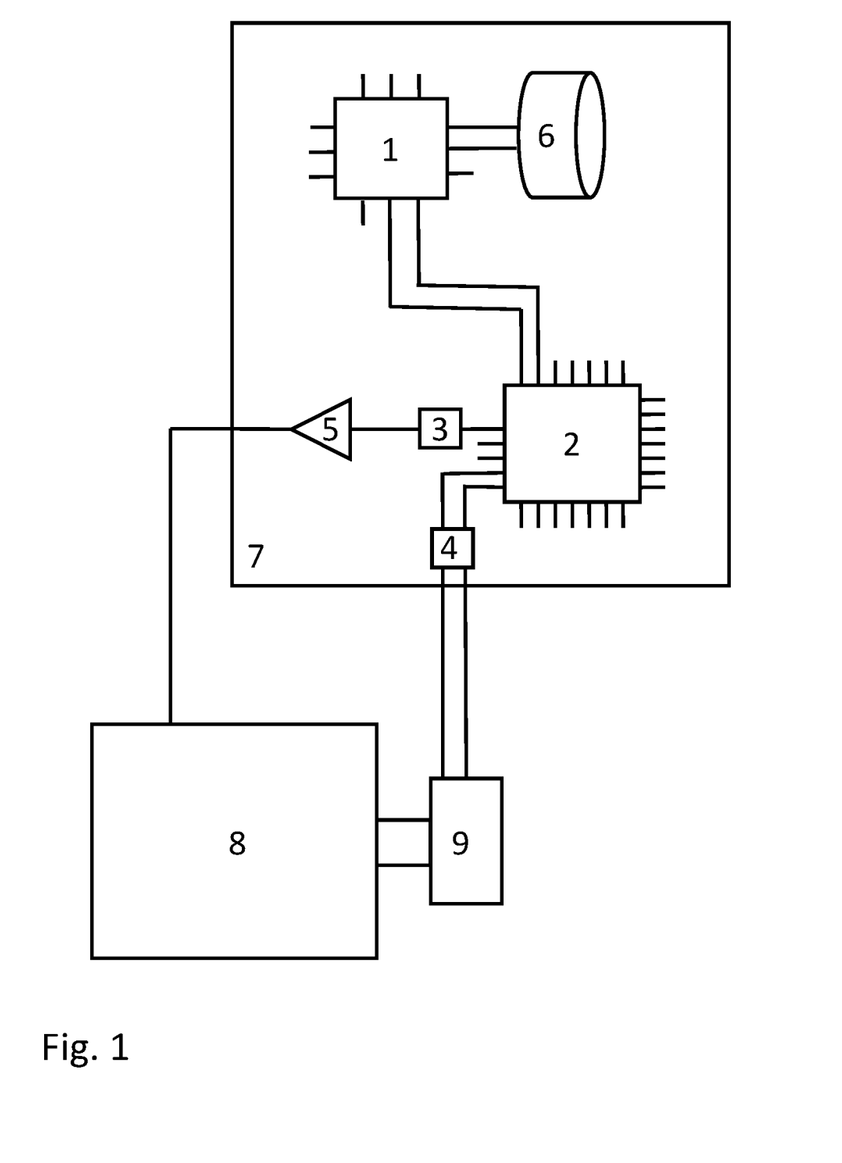
FIG. 1 shows a schematic representation of a control unit.

The illustration in FIG. 1 shows a schematic representation of a control unit 7, which is used in the example shown for driving an electric machine 8. The invention is applicable, in general, to any desired type of driven actuators and any desired type of control.

The control unit 7 comprises a microprocessor 1 and a programmable logic device 2, which are connected to one another through a data bus. The data bus can include any desired number of lines, in general; for reasons of clarity, only two lines are shown. The microprocessor 1 is connected to a nonvolatile memory 6, which can also be implemented as part of the microprocessor. During initialization of the control unit 7, the program executed by the microprocessor 1 and the configuration of the programmable logic device 2 can both be read out from the nonvolatile memory 6. The microprocessor 1 can have digital and analog interfaces and, for example, can be connected to a transceiver, not shown, of a vehicle data bus.

The programmable logic device 2, also referred to hereinbelow as FPGA device or FPGA, is connected to at least one digital-to-analog converter (DAC) 3 and one or more analog-to-digital converters (ADC) 4, which in general can also be integrated into the device. In the example shown, the output of DAC 3 is connected to a drive circuit 5. In general, the programmable logic device 2 can also be directly connected to a drive circuit for an electronically commutated motor or generator, e.g., to permit pulse-width-modulated driving of the individual phase windings. The drive circuit 5 is connected to the electric machine 8, which moves the rotor in accordance with the driving. The position of the rotor is measured by means of a resolver 9, which is connected to the at least one ADC 4. The invention is applicable, in general, to any desired type of sensors.

The control unit 7 shown can be a universal RCP system. An RCP system frequently outperforms a production control unit many times over not only in terms of computing power but also in terms of power supply and cooling. Since known components are used, many parameters required for a determination of the power consumption are known in advance, as for example the thermal resistance of a passive heat sink that is used, and the model or, for example, the static power dissipation of the FPGA used. Depending on the intended place of use, the ambient temperature still be determined or a minimum and a maximum ambient temperature can also be determined.

An FPGA device comprises a plurality of logic elements and connecting elements as well as a clock supply that may comprise multiple clock regions. The logic elements include registers, truth tables (also known as lookup tables or LUT), adders, switches, and delay units, for example. Frequency generators and drivers for an interface can also be present. Depending on the granularity of the FPGA device, several of these elements can also be combined into one elementary unit. The connecting elements usefully comprise conductive traces of differing lengths, which for example can also extend across regions of the FPGA, and switchable connections between the conductive traces and logic elements. The FPGA device usefully contains a configuration memory that contains at least one bit for each configurable logic element and each switchable connecting element. After the power supply is switched on, the FPGA is initialized with a bit stream that is written into the configuration memory of the FPGA.

A configuration of the FPGA can be represented on multiple levels, wherein a bit stream describing the configuration represents the lowest level (of abstraction), and the logic description is present on a higher level in the form of a netlist. Depending on the procedure for creating the configuration, still higher levels of abstraction may be present, and thus a description of the configuration in a hardware description language such as VHDL or SystemC may be present that is subsequently converted into a netlist. Description in the form of a block diagram of a technical computing environment such as Matlab/Simulink is also possible, since the block diagram can be translated into a representation of the FPGA configuration in a hardware description language, e.g., by means of the Xilinx System Generator. In this context, provision can also be made to generate both the code of the microcontroller and the configuration of the FPGA from connected block diagrams in order to make a combined controller possible.

Figure 2A:
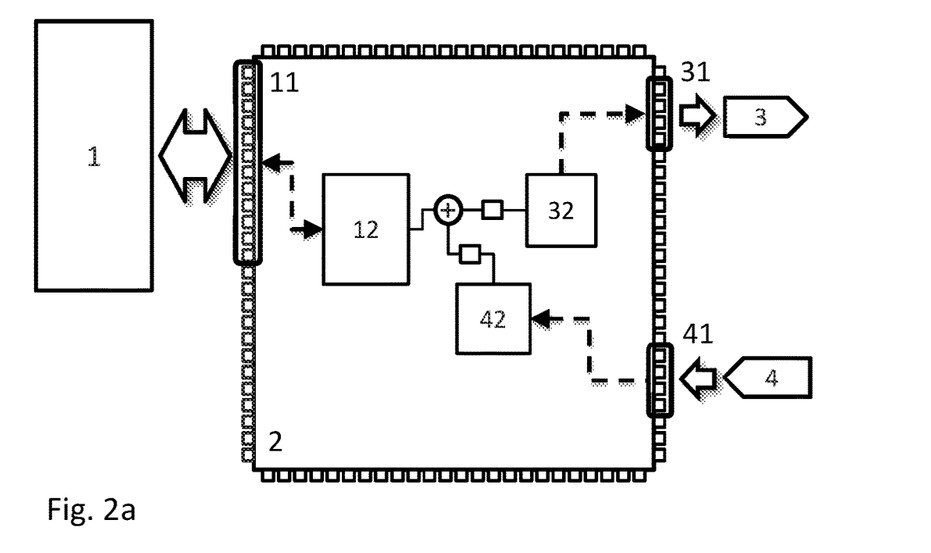
FIG. 2a shows a schematic view of a first configuration of a programmable logic device.

The illustration in FIG. 2a schematically shows a first configuration of an FPGA device 2, wherein interface pins of the FPGA device are indicated as rectangles arranged in four rows. A first group of interface pins 11 is connected through a data bus to a computing unit such as a microprocessor 1. The first interface pins 11 are internally connected to a register 12 through which the exchanged data can be buffered and/or further processed. A second group of interface pins 41 is connected to an analog-to-digital converter 4 that represents a signal source. The second interface pins 41 are connected to a register 42 that can be read by logic elements of the FPGA that are not shown, and for example, provides input data for a controller. A third group of interface pins 31 is connected to a digital-to-analog converter 3 that represents a signal receiver. The third interface pins 31 are connected to a register 32 that can be written by logic elements of the FPGA that are not shown. In general, other signal sources and signal receivers can also be connected to the FPGA device. In the configuration shown it is generally of no importance whether a rate of change of the interface pins 11, 31, 41 or a rate of change of the associated register 12, 32, 43 is determined, since a 1:1 correspondence exists between them.

Figure 2B:
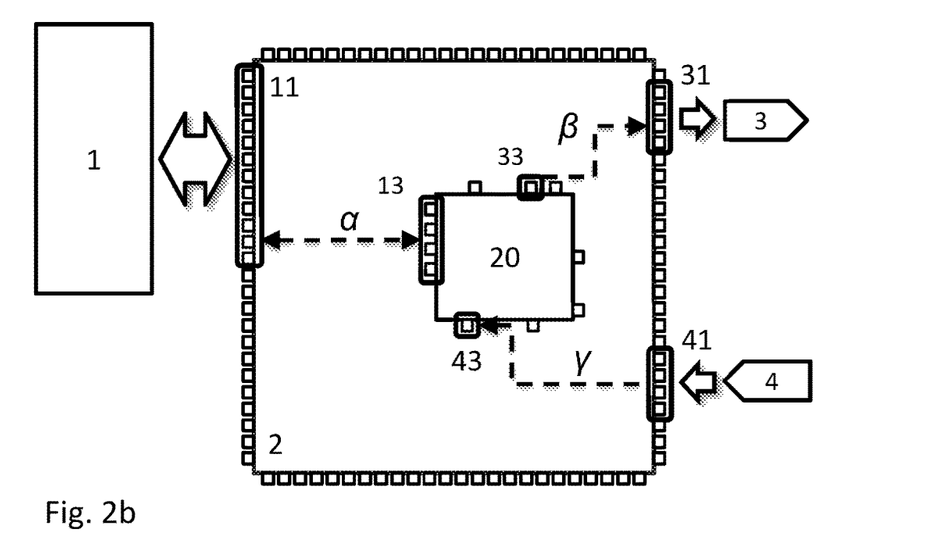
FIG. 2b shows a schematic view of a second configuration of a programmable logic device.

The illustration in FIG. 2b schematically shows a second configuration of an FPGA device 2, wherein interface pins are indicated as rectangles arranged in four rows. In contrast to the first configuration, the second configuration is divided into an intermediate layer or a transformation portion and an inner controller model 20 or model portion, which can occur, for example, if the configuration of the FPGA was generated with the aid of a block diagram of a control algorithm. The transformation portion can also provide an interface for the communication between a microprocessor and the programmable logic device, for example. The controller model 20 has dedicated input/output blocks, which are represented here as bus block 13, input block 43, and output block 33. Depending on the layer (of abstraction) of the description of the model, these blocks correspond to the registers 12, 42, and 32 or logic units that are mapped to these blocks.

In the case of an intermediate layer or a transformation portion, it may be the case that no 1:1 correspondence exists between a rate of change at an interface pin of the FPGA device 2 and a rate of change at an associated register of the controller model 20. Since the transformation portion is predetermined or consists of a number of predefined elements, the relationship between the rate of change at the relevant group of interface pins 11, 41, 31 and the associated component 13, 43, 33 of the controller model 20 can be described in the form of a mapping function α, β, γ. The intermediate layer can include a multiplexer, for example, wherein the mapping function α, β, γ can include a delay of the signal and a limitation of the maximum rate of change. In the example shown, the first interface pins 11 are connected to a microprocessor 1 through a data bus, wherein the effect of the intermediate layer is described by a mapping function α, which can also indicate a proportionality, for example. The second interface pins 41 are connected to a signal source 4, wherein the effect of the intermediate layer is described by a second mapping function β. The third interface pins 31 are connected to a signal receiver 3, wherein the effect of the intermediate layer is described by a third mapping function γ. The mapping functions α, β, γ usefully describe the logic element of the controller model 20 that is affected by a change in a signal value of an interface pin 11, 41, 31, and what delay arises in this process.

During the design of a control unit, it is desirable to check in advance with the aid of the controller model whether overheating of the FPGA will occur during testing in an RCP system. Primarily on account of simplifying assumptions, programs provided by FPGA manufacturers for estimating the static and dynamic power consumption of the FPGA cannot offer a sufficiently accurate answer here. While the static power consumption is largely known in advance, an interface activity or rate of change of the interface pins can have a strong influence on the dynamic power consumption, and should therefore be taken into account as accurately as possible in the estimation. A clock frequency that can be predefined by the user also significantly affects the dynamic power consumption. It is advantageous when the predefined clock frequency is transferred by a program for generating the controller model or the FPGA configuration through a software interface to a program for estimating the dynamic power consumption.

At an early stage of development, the interface activity can be determined using a first method with the aid of the characteristics of the computing unit that is connected to the interface pins through a data bus or the characteristics of the tasks executed by this computing unit as well as the characteristics of the signal source and the signal receiver.

For the first interface pins 11, which preferably are connected to a real-time computer, a first rate of change can be determined with the aid of the read/write rate of the tasks of the real-time computer, wherein a new value is transmitted once per task period (e.g., 1 millisecond) of the task in which the read/write access takes place. If the data are transmitted in parallel over multiple lines, for example, a maximum of one switching of the interface pins 11 can thus occur in the task period (e.g., 1 millisecond). Whether this switching actually takes place also depends on a probability of change of the applicable data, which can be 20% to 30%, for example. The probability of change can be predetermined, for example, can be empirically determined with the aid of the characteristics of the controller model 20, or manually selected by a user.

For the second interface pins 41, which are connected to a signal source, a second rate of change can be determined with the aid of the characteristics of the signal source. If the signal source is an analog-to-digital converter 4, for example, both the resolution of the value (e.g., 16 bits) and the duration of the conversion depend on the converter device used, and can thus be determined with the aid of the datasheet or established characteristics of the converter device. A sample rate of the signal source can be employed for determining the second rate of change. A probability of change of the received data can be predetermined or manually selected by a user.

For the third interface pins 31, which are connected to a signal receiver, as for example a drive circuit for an actuator, a third rate of change can be determined with the aid of the characteristics of the actuator and/or of the process to be controlled. A probability of change of the transmitted data can be predetermined or manually selected by a user.

Because the characteristics of the devices connected to the FPGA device are taken into account, the interface activity of the FPGA can be determined to a close approximation. When an intermediate layer or a transformation portion is present, the rates of change between interface pin and associated logic element, for example, a driver, are usefully converted with the aid of the appropriate mapping functions. The accuracy and reliability of the estimation can be improved owing to the fact that the interface activity determined or the applicable number of interface pins, the applicable rate of change, and the applicable probability of change are delivered to a program known per se for estimating the power consumption.

Figure 3:
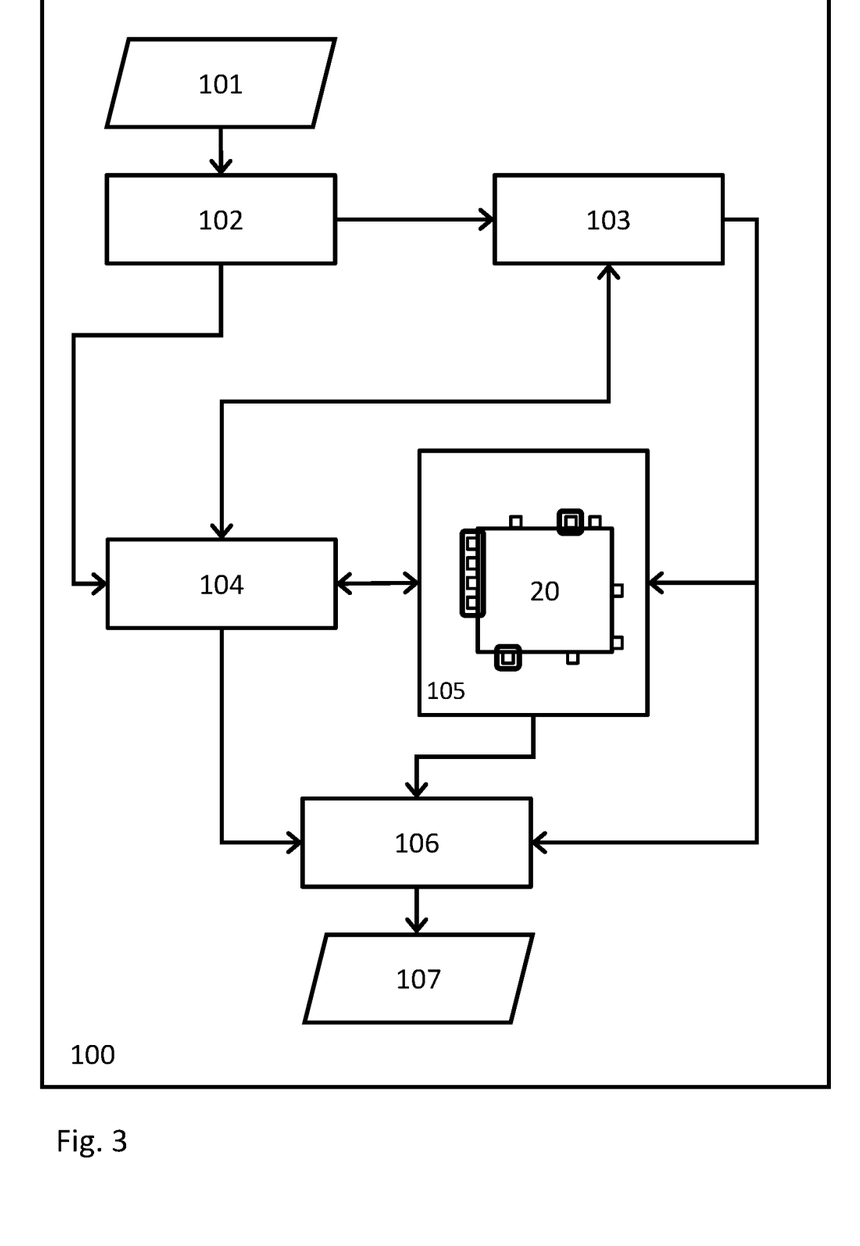
FIG. 3 shows a schematic representation of a simulation of a control unit.

The illustration in FIG. 3 shows a schematic representation of a simulation of a control unit that can be carried out in an intermediate development phase when the controller model has already been created, but the control unit is not yet present as hardware. In the example shown, the entire situation takes place on a simulation computer 100, which can be implemented as a standard PC for example.

In the simulation, selected test data 101 such as a target course of a vehicle, are predefined as input quantities. When a vehicle stability control system is being tested, the target course can be selected such that, for example, a safety-critical situation is imminent and thus a controller intervention should take place. The test data are provided to automation software 102, which drives the other software components; this is indicated in the drawing with arrows that lead to two additional software components. In general, the automation software 102 can drive one, several, or all software components that are executed.

In the example shown, the test data 101 or derived control information is provided to an environment model 103 and a system model 104, for example, a vehicle model. If a vehicle stability control system includes an emergency braking function based on information from one or more environmental sensors, the environment model 103 can include simulated sensor data, for example. The system model 104 can describe the behavior of a motor vehicle and can also include an actuator simulation, for example. The system model 104 can also include a simulation of one or more additional control units or microprocessors that are connected to the controller model 20 or to the FPGA device through a data bus. The system model 104 receives, for example, the output signals of the controller model 20, and can exchange data with the environment model 103.

In general, the controller model 20 can be calculated directly with the aid of a block diagram in a technical computing environment. Preferably, however, a configuration of the FPGA is generated with the aid of the controller model 20 and executed in a virtual control unit 105. Provision can be made for the simulation that the FPGA configuration that has been generated or analyzed includes only the model portion corresponding to the controller model 20. Specifically, this can be made dependent on whether the power consumption of an RCP system is sought, in which case the transformation portion is therefore to be taken into account, or whether (as described below) stimuli at the virtual interface pins or input/output blocks 13, 43, 33 of the model portion are sought.

The output data of the environment model 103, vehicle model 104, and virtual control unit 105 are provided to an acquisition component 106. This component records, for example, the behavior over time of the signals present at the interface pins 11, 41, 31. The recorded signals 107 represent the output data, which can be analyzed for a more accurate estimation of the power consumption. As explained above, in general the signals can be accessed or acquired at the registers 12, 42, 32 of the FPGA configuration or the corresponding input/output blocks 13, 43, 33. The signals present at the corresponding interface pins 11, 41, 31 of the FPGA device 2 can be determined therefrom by means of the mapping functions $\alpha$, $\beta$, and/or $\gamma$. In this way a representative set of input and output signals can be acquired with the aid of a simulation of the process under consideration, making a significantly more accurate determination of the power consumption of the FPGA possible.

In an intermediate development phase, the interface activity can be determined with the aid of the characteristics of the recorded signals using a second method.

To this end, the recorded signals are analyzed with regard to rate of change and probability of change. One obtains a first rate of change for the first interface pins 11, which preferably are connected to a real-time computer, as well as a second rate of change for the second interface pins 41, which are connected to a signal source, and/or a third rate of change for the third interface pins 31, which are connected to a signal receiver, as for example a drive circuit for an actuator.

Depending on the problem, provision can also be made in this context to vary the analysis. Accordingly, a rate of change can be determined as an average over the entire duration of the simulated process in each case, or a division can take place into individual time segments with a rate of change determined for each of them. In this context, provision can be made to determine a worst-case rate of change from a comparison of the segments (or of the applicable data) that thus describes the fastest rate of change that actually occurs. Moreover, a rate of change can be determined for every interface pin individually or averaged over all first interface pins, all second interface pins, or all third interface pins.

The signal characteristics and thus the interface activity of the FPGA device can be determined accurately through the analysis of the signals occurring during the simulation of a typical process sequence. In that the interface activity determined or the applicable number of interface pins, the applicable rate of change, and the applicable probability of change are delivered to a program known per se for estimating the power consumption, the accuracy and reliability of the estimation can be improved significantly.

Figure 4:
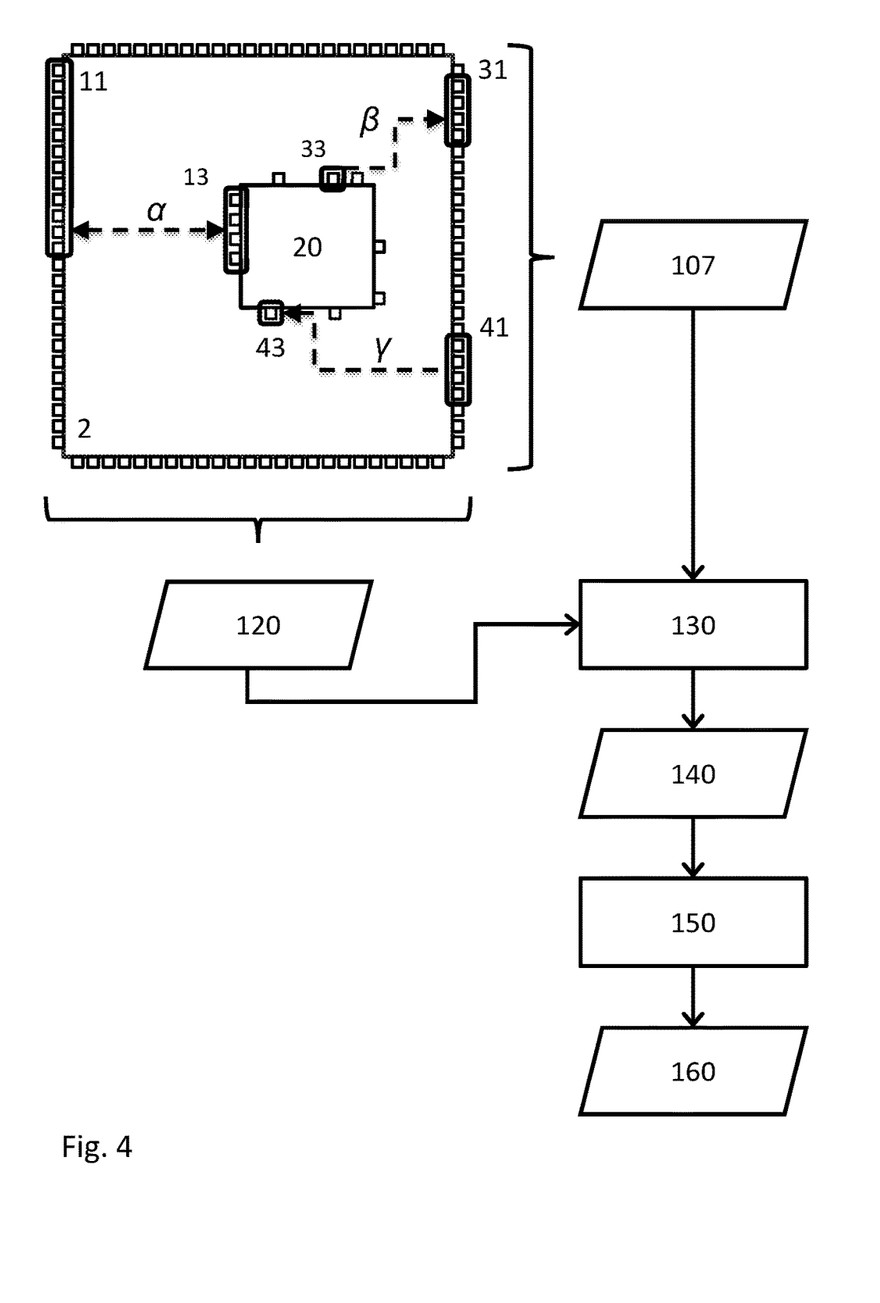
FIG. 4 shows a schematic diagram of a preferred embodiment of the method according to the invention.

Shown in the illustration in FIG. 4 is a schematic diagram of a preferred embodiment of a method according to the invention. With this third method, the interface activity can be determined even more accurately with the aid of the characteristics of the recorded signals in that a simulation of the internal switching state of all logic elements of the programmable logic device takes place.

Input data here are, firstly, the data 107 recorded during a simulation of a typical process sequence, such as, e.g., a predefined driving maneuver, which thus indicate the behavior over time of the individual interface pins 11, 41, 31 or of the corresponding logic elements 13, 43, 33 of the FPGA, and can be used as stimuli.

Secondly, the input data include the specific FPGA configuration 120 that was created on the basis of the controller model 20 and, if applicable, optionally of the transformation portion. This may be present as a placed netlist, for example.

The input data are delivered, in step 130, to a circuit simulation program that is known per se, which determines all internal switching states of the individual logic elements over the course of time and outputs them as a record 140 of the switching behavior of all gates of the FPGA device 2 over the course of time.

In step 150, the record of the switching behavior 140 is delivered to a program that is known per se for estimating the power consumption. Exact information on power consumption is output as output data 160, wherein changes over time or an instantaneous power consumption can also be determined, for example. In this context, a division into time segments and a selection of regions to be examined can take place on the basis of predefined conditions.

In this way, it is possible to determine in advance of an actual test drive whether, for example, the RCP system employed can execute the predefined controller model 20 in the desired driving maneuver while maintaining permissible operating conditions. The sequence described can, for example, also be integrated into a development environment for a controller model 20 so that a warning can be issued. Alternatively, provision can also be made to propose changes to the FPGA configuration such as, e.g., adjusting the clock frequency in order to ensure that permissible operating conditions are adhered to. The timely warning to the user prevents the occurrence of safety-critical situations in test operation.

Figure 5:
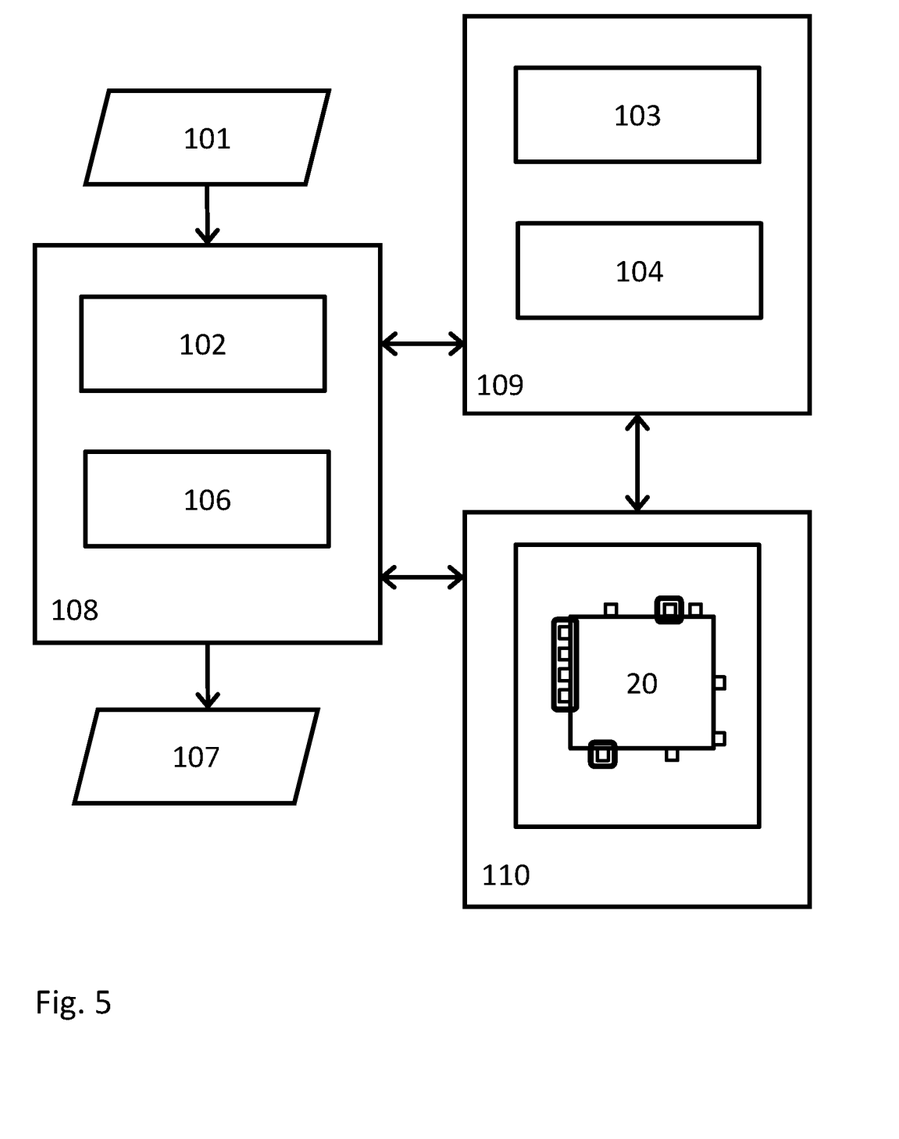
FIG. 5 shows a schematic representation of a hardware-in-the-loop test of a control unit.

The illustration in FIG. 5 shows a schematic representation of a hardware-in-the-loop test of a control unit, such as can be carried out in a later phase of the development process.

The test data 101 are delivered to a measurement computer 108, for example a standard PC. The measurement computer 108 is connected to a real-time computer 109 and control unit 110 through a data bus or a network interface, and exchanges data with them. Automation software 102, which drives the programs executed on the real-time computer 109, and an acquisition component 106, which records the data that are sent to or output by the control unit 110, are executed on the measurement computer 108.

Real-time computer 109 serves to simulate the controlled system or the process to be controlled. In the example shown, an environment model 103 and a vehicle model 104 are executed on the real-time computer.

The control unit 110 has an FPGA whose configuration includes the controller model 20. The real-time computer is connected at least indirectly to the interface pins of the FPGA. Alternatively, the first interface pins can be connected to a microcontroller located on the control unit. The control unit 110 can also be an RCP system.

On the basis of the test data 101, the automation software 102 drives the environment model 103 and vehicle model 104 in such a manner that they simulate the desired process or a desired driving maneuver and deliver the corresponding signals to the control unit 110. The signals received and output by the control unit 110 are recorded by the acquisition component 106 and are made available as output data 107.

The recorded signals of the hardware-in-the-loop test can be used to estimate the power consumption according to the third method described above. In general, it is also possible to use combinations of online and offline simulations to estimate the power consumption, which is to say with some parts of the overall system being physically present and other parts of the overall system being present purely in virtual form and only being simulated.

In a still later phase of development, provision can also be made to record the signals during a measurement, preferably carried out with an RCP system, of the real process, for example, a test drive. In doing so, therefore, the measurement computer and control unit are connected to the real controlled system or to actuators and sensors that are physically present, and they are operated in accordance with the desired test case. The controlled system here can also include one or more additional control units that are connected through at least one data bus to the control unit under test. The data or signals recorded within the framework of a test drive represent the actual interface activity still more accurately, and can be used as stimuli for the design of a production control unit, wherein a transformation to the virtual interface pins of the controller model preferably takes place on the basis of the known mapping functions.

To acquire the data exchanged with a computing unit, provision can be made to install a special driver on this computing unit that forwards a copy of all data to the measurement computer. Alternatively or in addition, it is also possible to create a configuration of the programmable logic device that includes one or more logic analyzers located on the device. The data received from a signal source or sent to a signal receiver can also be acquired by means of one or more logic analyzers located on the programmable logic device.

In general, the stimuli used for designing a production control unit can also be acquired with the aid of an offline simulation, wherein preferably the configuration includes only the model portion, and any possible transformation portion, which would be present in the production control unit only in altered form or not at all, is not taken into account. Consequently, the stimuli are acquired at the virtual interface pins of the controller model.

In an especially preferred method for designing a production control unit, therefore, a controller model is usefully generated by means of a graphical interface such as a block diagram, which describes a desired behavior of a controller or of a control unit. Using the block diagram, it is advantageously possible to create a configuration of a programmable logic device that can be tested, for example, with the aid of an RCP system in a hardware-in-the-loop test or a real test drive, wherein the data or signals that are exchanged are recorded and output as stimuli.

Once a specific FPGA device has been chosen, the stimuli can be employed for determining a required power supply and/or a required cooling performance in that the stimuli are provided to a program for estimating the power consumption of the target technology. The target technology here can include an FPGA of the same or a different product line from the same or a different manufacturer or a customer-specific device (ASIC) of a selected semiconductor technology.

This procedure makes it possible to transfer the power estimation to the production control unit. A manufacturer of control units can thus ensure even at an early stage in an integrated design process that the controller will consume only a specific [amount of] power in the real process. Provision can also be made here to examine the stimuli in segments, and for example, to take into account data from additional sensors (such as, e.g., a temperature sensor). Provision can also be made to identify especially energy-hungry parts of an implemented controller model so that a targeted optimization of these parts becomes possible. In particular, this can include marking of specific regions of a block diagram or graphical representation of an FPGA configuration.

The invention simplifies the determination of the expected power consumption of a control unit in various phases of development. Consequently, costs and environmental impacts resulting from an unnecessarily generous design of the FPGA component/ASIC, power supply, and/or cooling are avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a power consumption of a programmable logic device having a predefined configuration, the method comprising:
   determining at least one configuration parameter of the programmable logic device in accordance with the predefined configuration of the programmable logic device, the at least one configuration parameter describing structural characteristics of the predefined configuration; and
   determining at least one device parameter in accordance with the programmable logic device, the predefined configuration being configured such that the programmable logic device exchanges data with a computing unit through at least one interface pin and receives data from at least one signal source and/or sends it to at least one signal receiver through at least one interface pin, the at least one device parameter describing operating characteristics of the programmable logic device or a circuit containing the programmable logic device;
   determining at least one data characteristic of the data exchanged between the computing unit and the programmable logic device, the data characteristics including a first rate of change that is determined via a number and an interface activity of one or all tasks of the computing unit that are connected to the programmable logic device, the data characteristics further including a number of interface pins assigned for the data exchange with the computing unit, wherein the computing unit is a real-time computer operating under real-time constraints;
   determining at least one signal characteristic of the data received from the at least one signal source and/or sent to the at least one signal receiver, the at least one signal characteristic including a second rate of change associated with the at least one signal source and/or a third rate of change associated with the at least one signal receiver; and
   dynamically determining the power consumption as a function of the at least one configuration parameter, the at least one device parameter, the at least one data characteristic including the first rate of change of the data, and the at least one signal characteristic.

2. The method according to claim 1, wherein the first rate of change is a rate of change averaged over the assigned interface pins or a first rate of change is associated with every assigned interface pin.

3. The method according to claim 1, wherein the at least one signal characteristic includes a number of interface pins connected to a signal source and/or a number of interface pins connected to a signal receiver, wherein the second rate of change is determined via a sample rate of one or every signal source connected to the programmable logic device, and wherein the third rate of change is determined via an output rate of one or every interface pin connected to a signal receiver.

4. A method for determining a power consumption of a programmable logic device having a predefined configuration, the method comprising:
determining at least one configuration parameter in accordance with the predefined configuration, the at least one configuration parameter describing the structural characteristics of the predefined configuration of the programmable logic device; and
determining at least one device parameter in accordance with the programmable logic device, the predefined configuration being configured such that the programmable logic device exchanges data with a computing unit through at least one interface pin and receives data from at least one signal source and/or sends it to at least one signal receiver through at least one interface pin, the at least one device parameter describing operating characteristics of the programmable logic device or a circuit containing the programmable logic device;
determining at least one data characteristic of the data exchanged between the computing unit and the programmable logic device, the at least one data characteristic including at least one rate of change of the data;
determining at least one signal characteristic of the data received from the at least one signal source and/or sent to the at least one signal receiver; and
determining the power consumption as a function of the at least one configuration parameter, the at least one device parameter, the at least one data characteristic, and the at least one signal characteristic,
wherein the predefined configuration is simulated in a workstation or is written into the programmable logic device and executed,
wherein the computing unit, the at least one signal source, and/or the at least one signal receiver are operated or simulated such that the predefined configuration exchanges, receives, and/or transmits data corresponding to a predefined process, wherein the corresponding data are recorded for a predefined period of time or until a predefined end condition is satisfied, and
wherein the at least one data characteristic and the at least one signal characteristic are determined in accordance with the recorded data.

5. The method according to claim 4, wherein at least one signal source and/or at least one signal receiver is simulated.

6. The method according to claim 4, wherein at least one signal source and/or at least one signal receiver are physically present and are operated with signals in accordance with the predefined process.

7. The method according to claim 1, wherein at least one user parameter is predefined by the user, and wherein the power consumption of the programmable logic device is also determined as a function of the at least one user parameter.

8. A method for determining a power consumption of a programmable logic device having a predefined configuration, the method comprising:
determining at least one configuration parameter in accordance with the predefined configuration, the at least one configuration parameter describing the structural characteristics of the predefined configuration of the programmable logic device; and
determining at least one device parameter in accordance with the programmable logic device, the predefined configuration being configured such that the programmable logic device exchanges data with a computing unit through at least one interface pin and receives data from at least one signal source and/or sends it to at least one signal receiver through at least one interface pin, the at least one device parameter describing operating characteristics of the programmable logic device or a circuit containing the programmable logic device;
determining at least one data characteristic of the data exchanged between the computing unit and the programmable logic device, the at least one data characteristic including at least one rate of change of the data;
determining at least one signal characteristic of the data received from the at least one signal source and/or sent to the at least one signal receiver; and
determining the power consumption as a function of the at least one configuration parameter, the at least one device parameter, the at least one data characteristic, and the at least one signal characteristic,
wherein the predefined configuration has a fixed transformation portion and a freely selectable model portion,
wherein the transformation portion transforms the rate of change of data present on at least one assigned or connected interface pin according to a mapping function, and
wherein the rate of change present at the logic element of the model portion is determined for each assigned or connected interface pin in accordance with the mapping function.

9. The method according to claim 4, wherein the recorded data are divided into one or more segments, and wherein at least one segment is selected and output in accordance with a predefined selection condition.

10. The method according to claim 9, wherein the predefined configuration is written into the programmable logic device and executed, wherein the programmable logic device has at least one temperature sensor and/or at least one current sensor, and wherein at least one temperature signal and/or at least one current signal is recorded for the predefined period of time or until the predefined end condition is satisfied.

11. The method according to claim 4, wherein the determination of the power consumption includes a simulation of the predefined configuration, wherein an internal switching state of the programmable logic device is determined in each case via recorded data.

12. A method for designing a configuration of the programmable logic device comprising a step in which the power consumption of the programmable logic device is determined by the method according to claim 1 via a currently designed configuration.

13. The method according to claim 12, wherein the programmable logic device has one or more regions comprising at least one logic element, and wherein a message is output and/or a predefined clock frequency of at least one region of the programmable logic device is reduced and/or at least one logic element or at least one region comprising multiple logic elements is deactivated via a signal or a disconnection of a clock supply and/or power supply when the power consumption determined exceeds a predefined power threshold value.

14. A programming device for writing on the programmable logic device comprising:
   a processor; and
   a programming interface and/or a debugging interface,
   wherein the programming device is configured to carry out the method according to claim 1.

15. A computer program product with a computer-readable storage medium in which instructions are embedded that, when they are executed by the computing unit, have the effect that the computing unit is configured to carry out the method according to claim 1.

16. The method according to claim 1, wherein the at least one interface pin is at least one of a physical pin that is soldered into a circuit and that connects the programmable logic device to other parts of the circuit, a register located directly before or after the at leas tone interface pin of the programmable logic device in a signal path or a driver of an output that is used in the configuration.

17. The method according to claim 1, wherein the tasks of the computing unit are executed periodically, the tasks at least one of reading or writing new values once per task period.

18. The method according to claim 1, further comprising:
   operating the programmable logic device in a controller model under simulated environment, the simulated environment being executed on a simulation computer connected to the programmable logic device and including at least an environment model and a system model, the predefined configuration including a function as the controller model under the simulated environment,
   wherein determining the at least one data characteristic of the data exchanged between the computing unit and the programmable logic device is determined based on the operation of the system model under the environment model.

* * * * *